United States Patent [19]

Abdelazim

[11] Patent Number: 5,335,289
[45] Date of Patent: Aug. 2, 1994

[54] RECOGNITION OF CHARACTERS IN CURSIVE SCRIPT

[75] Inventor: Hazem Y. Abdelazim, Cairo, Egypt

[73] Assignee: International Business Machines Corporation, Armonk, N.Y.

[21] Appl. No.: 837,450

[22] Filed: Feb. 14, 1992

[30] Foreign Application Priority Data

Feb. 13, 1991 [EG] Egypt .................. 91301146.6

[51] Int. Cl.⁵ .............................................. G06K 9/34
[52] U.S. Cl. ........................................ 382/9; 382/39; 382/14; 382/20
[58] Field of Search .................. 382/9, 13, 36, 39, 40, 382/22, 37, 30, 34, 14, 20

[56] References Cited

U.S. PATENT DOCUMENTS

| | | | |
|---|---|---|---|
| 3,643,215 | 2/1972 | Ingham et al. | 382/21 |
| 4,288,779 | 9/1981 | Otsu et al. | 382/18 |
| 5,034,991 | 7/1991 | Hagimae et al. | 382/36 |
| 5,067,166 | 11/1991 | Ito | 382/37 |
| 5,075,896 | 12/1991 | Wilcox et al. | 382/39 |

FOREIGN PATENT DOCUMENTS

2516671  6/1974  Fed. Rep. of Germany ......... G06K 9/06

OTHER PUBLICATIONS

H. Y. Abdelazim & M. A. Haskish, "Automatic Reading of Bilingual Typewriter Text", IEEE Confer., Hamburg, GE, vol. 2, pp. 140–144, May 8–12, 1989.

M. Krlemakhem & M. C. Ferri, "Arabic Typewritten Character Recognition Using Dynamic Comparison", Proc. 1st Kuwait Computer Conf., pp. 455–462, Mar. 1989.

T. Sheikh & Guindi, "Computer Recognition of Arabic Cursive Scripts" Pattern Recognition, vol. 21, No. 4, 1988, pp. 293–302.

R. Casey et al., "Recursive Segmentation & Classification of Composite Character Patterns", IEEE Computer Society Pres., pp. 1023–1026, Oct. 19–22, 1982.

T. Shimizu, "Pattern Recognition Device", Patent Abstracts of Japan, vol. 12, No. 468, p. 797, Dec. 8, 1988.

Bozinovic et al. "Off-Line Cursive Script Word Recognition" IEEE Transactions on Pattern Analysis and Machine Intelligence, VII #1 Jan. 1989, pp. 68–83.

*Primary Examiner*—Leo H. Boudreau
*Assistant Examiner*—Larry J. Prikockis
*Attorney, Agent, or Firm*—Lauren C. Bruzzone; Joseph C. Redmond, Jr.

[57] ABSTRACT

A system and method for recognizing characters in cursive script is provided in which the script is scanned to detect word boundaries and words are then segmented into characters. This is accomplished by segmenting the script to form an initial portion, the segmentation being performed with reference to its position relative to a word boundary. This initial portion is then compared with a set of reference portions. Subsequent portions of the script are taken in sequence and compared with reference portions until a character is identified with an uncertainty less than a predetermined threshold value. A new initial portion is then segmented, with the new initial portion chosen on the basis of the average width of the character identified and the comparison process repeated to identify the next character.

11 Claims, 3 Drawing Sheets

| 54 — | FIRST BLACK SEGMENT : No. OF PIXELS - 4 | $v = \begin{bmatrix} 4 \\ 3 \\ 5 \end{bmatrix}$ |
| 55 — | SECOND WHITE SEGMENT: No. OF PIXELS - 3 | |
| 56 — | THIRD BLACK SEGMENT : No. OF PIXELS - 5 | |

A COLUMN OF PIXELS EXTRACTED AND MAGNIFIED

RECOGNITION OF CHARACTERS IN CURSIVE SCRIPT

BACKGROUND OF THE INVENTION

1. Field of Invention

The invention relates to a system and method for character recognition. More particularly, the invention relates to recognizing characters in cursive script which cursive script may be of any kind, but in particular, could be typewritten Arabic script, since Arabic writing is by its nature in cursive form and it is unacceptable to write Arabic with isolated characters.

2. Prior Art

Character recognition has been a subject of intensive research for a long time, to provide practical means for processing large volumes of already existing data automatically.

Taking typewritten script as an example, the characters used to produce words are, for many languages, isolated. However, with some languages such as Arabic, the characters are generally not isolated and are strung together to form cursive script. Thus a major problem arises when attempting to recognize cursive script in how to identify the constituent characters within the script.

A number of approaches have been described in the prior art. One approach involves a segmentation algorithm developed to resolve the cursiveness problem based on an Energy-like approach. The process first detects lines of script and 'Pieces of Arabic Word' (PAWs) by standard image processing techniques. A PAW is defined in the article as a part of an Arabic word separated by vertical boundaries (assuming the lines of text are horizontal).

Next the PAWs are segmented by producing energy-like curves based on the 'black-to-black' height of their constituent pixel columns. A preselected threshold value traverses this curve yielding significant primitives and leaving out 'dead' or silent zones.

Then two consecutive clustering procedures are carried out to group similar primitives into groups so as to facilitate the recognition process. Once the primitives have been recognized the appropriate characters are reconstructed.

This process has the disadvantage that segmentation of the PAWs takes place before recognition and so causes complexity by increasing the number of pattern classes to be recognized. In addition the recognition system is relatively slow due to the time exhausted in the segmentation step which precedes recognition.

In the article 'Automatic Recognition of Bilingual Typewritten Text', Proc. of COMPEURO '89 VLSI & Computer Peripherals IEEE Conference in Hamburg, vol.2 pp. 140–144, 8–12 May 1989, Mr Abdelazim and Mr Hashish discuss a recognition system based on a combined statistical/structural approach. The process follows a similar routine to the previous piece of prior art in that the 'Pieces of Bilingual Word' ( PBWs ) are segmented into primitives using the same segmentation method as above.

The primitives are then clustered and passed through a decision tree module to produce a set of candidate primitives. The input primitive is then correlated with these candidates and depending on the degree of correlation is matched to one of the candidates. If the correlation is not above a desired level the input primitive is shifted one pixel in its reference frame and then fed back into the decision tree to repeat the process. Hence this piece of prior art also carries out segmentation before recognition and suffers from the same drawbacks as the previous piece of prior art.

The article 'Arabic Typewritten Character Recognition Using Dynamic Comparison', Proc. 1st Kuwait Computer Conference, pp. 455–462, Mar. 1989, describes a method based on dynamic programming techniques which allows character recognition with no segmentation phase. A word containing a set of characters (T) is isolated and an image of the word formed. Then the image is compared with a concatenated combination of representative character patterns obtained from a library of reference patterns. Several combinations may be tried and the boundaries of the characters in T are obtained by projecting the intersections of the 'optimal path' (as described in the article) with the boundaries of the characters contained in the best combined reference from the library. This approach involves a large number of comparisons and is accordingly extremely time consuming.

The article 'Computer Recognition of Arabic Cursive Scripts', Pattern Recognition, Vol. 21, No. 4, 1988, pp. 293–302, discusses a method involving a contour following algorithm to produce the segmentation of Arabic words into their constituent characters. The input to the segmentation algorithm is a closed contour representing either a complete word or a subword. The segmentation process is based on the calculation of the contour height (h) which is the distance between the two extreme points of intersection of the contour with a vertical line.

Working on the principle that the contour height is usually very small at the boundaries between different characters the constituent characters are extracted. These characters are represented by their outer contour and any diacritics present, and are classified as a particular known character in a classifying stage.

This method lacks generality and is font-specific. It also is dependent on accurate segmentation occurring in order to allow the recognition phase to work well.

SUMMARY OF THE INVENTION

It is an object of the present invention to provide an improved system and method for recognizing cursive script, which does not require segmentation before recognition.

Viewed from a first aspect a method is provided for recognizing characters in cursive script in which the script is scanned to detect word boundaries and words are then segmented into characters, characterized by the steps of:

(i) choosing a word boundary and extracting portions of a word associated with said boundary;

(ii) comparing selected portions successively with a set of reference portions representing known characters until a character within said word has been identified as one of said known characters;

(iii) skipping a number of portions depending on the identified character and then repeating the process from step (ii) for the identification of next and subsequent characters.

The method of the present invention can be implemented in a variety of ways but in preferred embodiments the method is characterized by the steps of:

(a) forming a series of vectors representing features of the script at different positions in the characters constituting the script;

(b) comparing an initial vector, chosen with reference to a word boundary, with a known vector from a set of reference vectors;

(c) determining an accumulated uncertainty value relating to the degree with which the compared vector identifies a known character;

(d) comparing said accumulated uncertainty value with a predetermined threshold value;

(e) if said accumulated uncertainty value is less than said threshold value then recognizing the character as said known character, otherwise selecting subsequent vectors for comparison with said set of reference vectors, and repeating steps (c) to (d) until said uncertainty value is less than said threshold value;

(f) selecting a new initial vector in accordance with the character so identified, comparing said vector with said set of reference vectors, and repeating the process from step (c) for the identification of the next and subsequent characters.

Also in preferred embodiments the method is able to repeat steps (ii) and (iii) until another word boundary is reached, at which time the method is repeated from step (i) for a different word boundary. Hence the method can continue indefinitely until all the script has been read.

The method can be used to recognize any cursive script, but in preferred embodiments said cursive script is typewritten cursive script using characters selected from a predetermined font. Typewritten cursive script is advantageous since characters in typewritten cursive script are more accurately reproducable than in handwritten script.

The set of reference portions can be formed in a variety of different ways, such as by loading libraries of reference portions relating to different fonts stored on software, or by allowing the user to store his own fonts on a storage device using the devices provided by the system. In preferred embodiments, the set of reference portions is formed by the latter method during a learning phase by the steps of: entering into a storage device said set of reference portions representative of possible portions relating to characters in said font, and assigning each such portion a particular label; scanning each character belonging to said font in turn to produce a sequence of portions and hence a sequence of labels identified with said character, and storing said sequences in said storage device. This is advantageous since the user can enter his own customized fonts as required.

Viewed from a second aspect a system is provided for recognizing characters in cursive script in which the script is scanned to detect word boundaries (40) and words are then segmented into characters, characterized by:

sectioning means (50) for forming a series of portions representing features of the script at different positions in the characters constituting the script;

recognition and segmentation means (60) for comparing an initial portion, chosen with reference to a word boundary, with a known portion from a set of reference portions and to compare subsequent portions in said series similarly with known portions, until the cumulative results of the comparison identify a character with an uncertainty less than a predetermined threshold value, and then to repeat the comparison process starting with a new initial portion selected in accordance with the character identified.

DESCRIPTION OF THE DRAWINGS

The present invention will be described further, by way of example only, with reference to an embodiment thereof as illustrated in the accompanying drawings, in which.

DESCRIPTION OF PREFERRED EMBODIMENT

In the preferred embodiment a system will be described for recognizing characters in typewritten Arabic-script. In the following description the term 'word' will be used to define a string of characters contained within two adjacent word boundaries.

Figure 1:
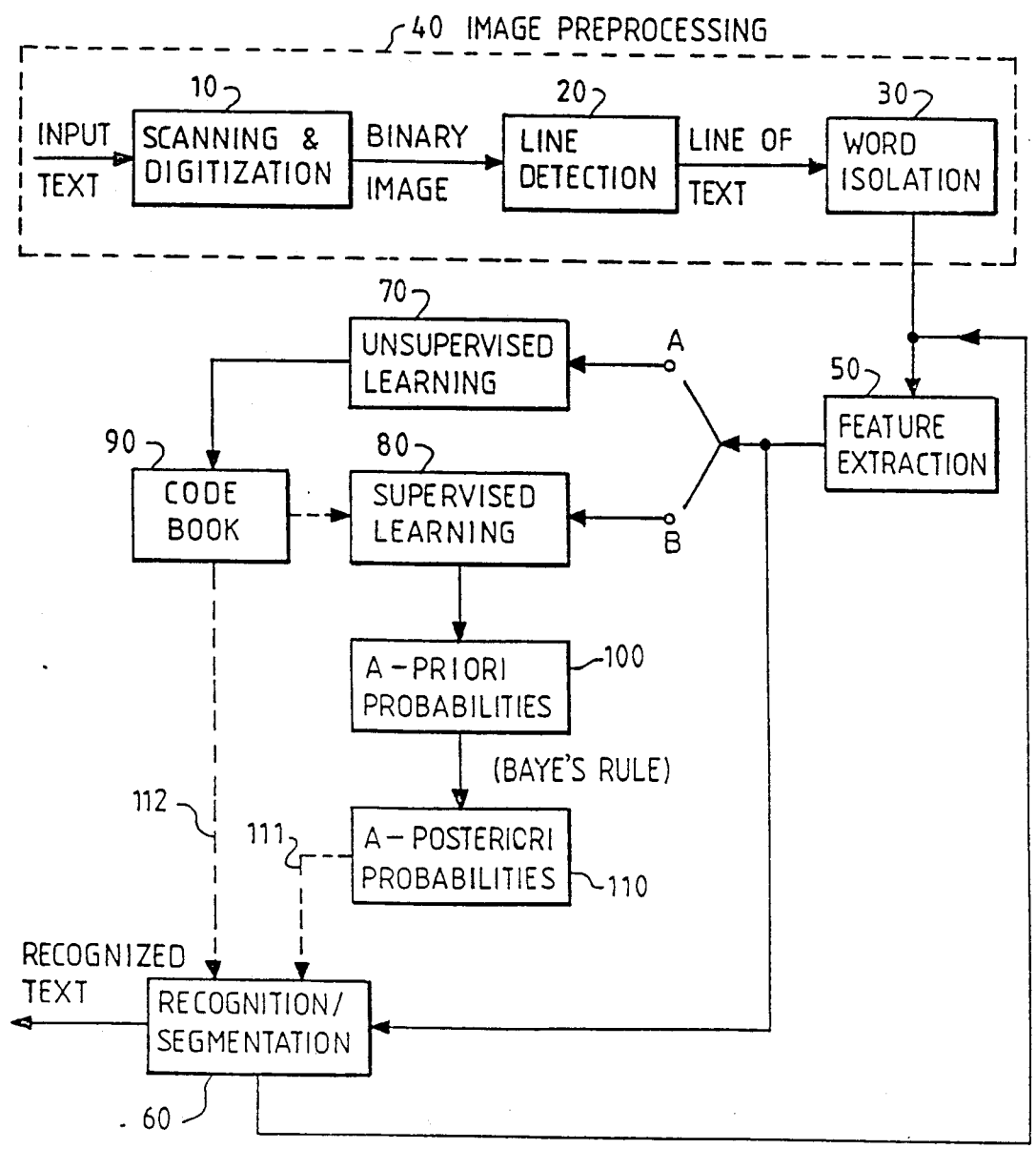
FIG. 1 is a block diagram showing the processes carried out by an embodiment of the present invention.

FIG. 1 shows as a block diagram the processes carried out by the embodiment. Initially the cursive script enters a process 10 where it is scanned by a detector (not shown) to produce a digital representation of the script. This digital representation next enters a process 20 where line structure of the script is determined and then, via a process 30, word boundaries are detected and patterns relating to words are isolated. The aforementioned processes 10, 20, 30, collectively referred to as image preprocessing 40, are well known in the art, and hence will be discussed no further.

Figure 2A:
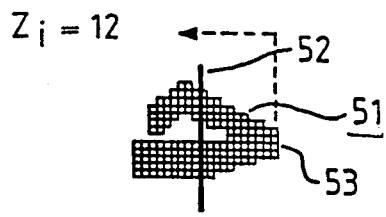
FIG. 2(a) is a diagram which shows the feature extraction process employed in the embodiment.

In the embodiment the script shall be considered to be written in the form of black print on white paper, although it will be appreciated by one skilled in the art that the invention is in no way limited to this particular representation. The digital pattern of a word thus consists of a series of black and white pixels. The process 50 of extracting features of the script represented in this format will be discussed with reference to FIG. 2(a).

Taking a line of text as a horizontal reference and starting at a word boundary, an initial column of pixels is read and a vector (v) is formed, such that the dimension of the vector depends on the number of black/white segments in the column, and the elements of each vector represent the number of pixels in the corresponding segment. This vector is then passed on to the next process, the detector moves one column to the left and the next column of pixels is read to form another vector. Taking the example in FIG. 2(a), the detector is positioned over the twelfth column 52 from the rightmost edge 53 of a sample word 51, the parameter Zi indicating the ith column and thus being assigned the value 12 in this instance. This column consists of four black pixels 54, followed by three white pixels 55, followed by five black pixels 56. A vector 57 formed by the above process is:

$$v = \begin{vmatrix} 4 \\ 3 \\ 5 \end{vmatrix}$$

Returning to FIG. 1 and before describing the 'Recognition/Segmentation' phase 60 of the embodiment it is convenient to describe the learning process employed during the setting up of the system to provide a reference library for the recognition phase.

The ultimate goal of any character recognition system is the capability to read a wide variety of typewritten fonts. This is accomplished in the learning phase, where the system is set up to recognize a particular typewritten font. The learning phase is divided into two successive phases, namely, the unsupervised 70 and supervised 80 learning phases.

As shown in FIG. 1, Branch A, the main task performed in the unsupervised learning phase 70 is the generation of a "Code Book" 90. The "Code Book" 90 is a set of reference vectors representative of possible vectors relating to characters in the chosen font. The characters associated with the chosen font are entered into the image preprocessing process 40 and the associated vectors extracted by the feature extraction process 50. Several scans of the characters are made to increase statistical accuracy and the resultant vectors fed into an unsupervised learning process 70 through Branch A of FIG. 1. In this process 70 an unsupervised clustering algorithm, described, determines the different vectors present and stores them in the Code Book 90 as a set of reference vectors, assigning each vector a label by which it can be identified.

The learning process next enters the supervised learning phase 80. In this phase the statistics needed for the recognition/segmentation process 60 are computed. Isolated characters for a given font are fed to this module 80 as shown in FIG. 1, branch B, after passing through feature extraction process 50. Assuming that the total number of characters (pattern classes) is K, and that S samples are available for each character, the necessary statistics expressed by the a-priori conditional probability $P(Zi\rightarrow Cj)/\Omega_k$, are given in an operation 100 by the following equation:

$$P(Zi\rightarrow Cj/\Omega_k) = \frac{N(Zi\rightarrow Cj)/\Omega_k)}{S}$$

The terms of the above equation are defined as below:
$\Omega_k$ : is the kth pattern class (character), k=1...K.
Zi : is the ith column position within the character starting from the rightmost edge.
Cj : is the jth element in the Code Book
Zi->Cj : is the labelling of the ith column position with the jth element in the Code Book.
N(.) : is the frequency of occurrence of the event inside the argument.

The value of 'Zi→Cj' is found by extracting a feature vector from the ith column using feature extraction process 50 already discussed, and then assigning the label of the nearest Code Book vector (using a simple absolute distance measure) to this vector. The absolute distance measure used is known as 'City-Block' and is defined by the equation:

$$dj = |Vj - X| = \sum_{i=1}^{n} |Vj(i) - X(i)|$$

The terms of the above equation are defined as below:
dj : is the absolute distance measure.
Vj : is the jth reference vector that corresponds to an element in the Code book.
X : is the feature vector extracted from the input character.
n : is the number of segments in the vector (the dimension of the vector).

Thus Cj is the label of the reference vector Vj that is closest to X, and hence produces the smallest value of dj. J ranges over all the vectors in the Code Book.

Figure 2B:
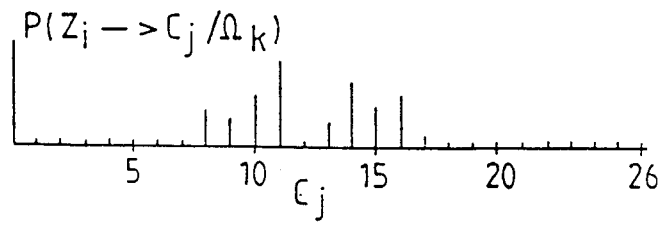
FIG. 2(b) is a graph which illustrates the form of the a-priori probability distribution calculated in the learning phase.

An example of the a-priori probability distribution is shown in FIG. 2(b).

The a-posteriori probability needed in the recognition/segmentation process 60 can now simply be obtained by Baye's rule in an operation 110 as follows:

$$P(\Omega_K/Zi\rightarrow Cj) = \frac{P(\Omega_k)P(Zi\rightarrow Cj/\Omega_k)}{P(Zi\rightarrow Cj)}$$

This distribution is computed off-line for all possible $\Omega'_k$s Zi's and Cj's before the recognition process.

Also in the supervised learning process 80 the average width of each character is determined by calculating this width for several samples (eg. 10 samples) and then computing a simple statistical average given by:

$$\text{Average} = \frac{1}{Ns} \sum_{i=1}^{Ns} Wi$$

where 'Wi' is the width in pixels of the ith sample for a given character, and 'Ns' is the number of samples. This completes the learning process of the system.

A script to be read is entered into the system through the detector and is first passed through the image preprocessing process 40. Then the feature extraction process 50 and the Recognition/Segmentation process 60 operate as described below:

1. Starting at a word boundary, a feature vector of the rightmost column of the digital form of the associated cursive word is extracted by the feature extraction process 50.

2. This vector is then passed to the recognition/segmentation process 60 where in a step 1 it is first assigned a label Cj, after matching with the nearest vector in the Code Book, as shown by the dotted line 112 in FIG. 1.

3. Based on the current position within the word (Zi), and the label value Cj, the instantaneous a-posteriori probabilities $P(\Omega_k/Zi\rightarrow Cj)$ are retrieved from the a-posteriori probabilities block 110, as shown by the dotted line 111 in a step 2 of process 60.

4. In a step 3 of process 60 an accumulated probability distribution Pa is computed by adding together the previous instantaneous probability distributions, and then normalising on the sum of the probabilities.

5. In a step 4 of process 60, the uncertainty at the present position Zi, given by the entropy H(i), is computed by the formula:

$$H(i) = -\sum_k Pa(\Omega_k/Zi\rightarrow Cj)\text{Log}(Pa(\Omega_k/Zi\rightarrow Cj)$$

6. In a step 5 of process 60, a decision is taken based on a Recognition rule which employs a preselected entropy threshold Hmin related to the desired recognition performance. The recognition rule involves the following steps:

If H(i) < H min :

1. Recognize the unknown character as the reference character with maximum Probability.

2. Suspend recognition process.

3. Jump to the left edge of the recognized character, based on the average width of the recognized character as determined in the learning phase, and extract a feature vector corresponding to the next column and goto step 2.

If $H(i) > H$ min :1-i$\rightarrow$i+1, 2- if 'i' is equivalent to the last column of the word then terminate, else extract a feature vector corresponding to the i+1 th column and goto step 2.

In a step 7 the process is repeated from step 1 when the end of a word is reached and another word boundary is selected.

Although the above description of the recognition/segmentation process 60 discusses starting at the rightmost edge of a word it will be appreciated by those skilled in the art that this is not a necessary feature of the invention, and that the process could work equally well by reading the columns starting from the leftmost edge, for example in reading script other than Arabic where the leftmost edge is a more appropriate reference.

Figure 3:
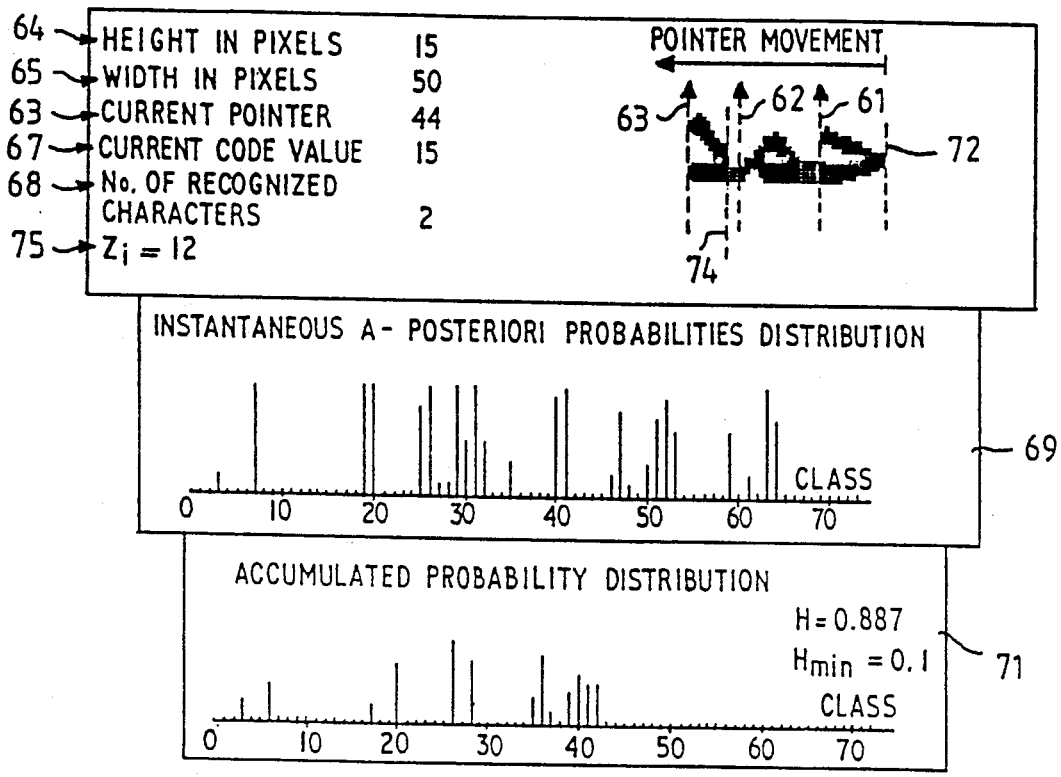
FIG. 3 is a diagram and graph which illustrate the recognition/segmentation mechanism of the embodiment.

FIG. 3 illustrates the recognition/segmentation mechanism of the preferred embodiment. It shows a word containing three characters and having a height 64 of 15 pixels and a width 65 of 50 pixels. The current pointer 63 is at a position 44 pixels from the rightmost edge 72 of the word. Two characters have already been recognized, the numeral 61 denoting the left border of the first character and the numeral 62 denoting the left border of the second character.

The recognition process is now trying to recognize the third character. The current position within the character 75 is $Zi = 12$. The corresponding Code value 67 is $Cj = 15$. The instantaneous a-posteriori probability distribution $P(\Omega_k/Zi=12) \rightarrow (Cj=15)$) and the accumulated probability distribution Pa with respect to the right border of the third character 74 are as shown in FIG. 3 (reference numerals 69 and 71 respectively). The uncertainty value 'H' is 0.887, while the threshold 'Hmin' is set at 0.1. Hence the uncertainty must fall by at least 0.787 during the analysis of the remaining six feature vectors if the third character is to be recognized.

The preferred embodiment described hereinbefore treats the recognition of cursive script using a new approach. It describes a combined recognition/segmentation process 60 that includes the following features that distinguish it from the prior art:

1. The approach is systematic and generally applicable to any cursive font.

2. The developed system is quick, since no time consuming computations are involved in the recognition phase. The a-posteriori probabilities used in the recognition are only "retrieved" and not "computed", since the computation has been done off-line in the learning phase.

3. A remarkable property of this recognition/segmentation process, is that most of the Arabic characters can be recognized by observing only 40% of the character, thus saving a considerable computational effort and leading to a fast algorithm.

The above described preferred embodiment has been used with 31 typewritten fonts of which 20 were Arabic fonts and 1 was a cursive English font. The recognition speed reached 130 words per minute on average and showed a recognition rate of 98%. The 2% error rate was mainly due to skew noise imposed from the detector, and can be improved by increasing the number of samples used in the statistics.

While the invention has been described with respect to a specific embodiment, it will be understood by those having skill in the art that changes can be made to the specific embodiment without departing from the spirit of the invention.

We claim:

1. A method of recognizing characters in cursive script in which the script is scanned to detect word boundaries and words are then segmented into characters, characterized by the steps of:
   (i) choosing and extracting (30) a word boundary from a cursive script comprised of characters;
   (ii) starting at said word boundary, extracting (50) a portion of said word;
   (iii) comparing (60) said extracted portion with a set of reference portions representing known characters, each of said known characters having an average width;
   (iv) extracting a second portion, said second portion being successive to said first portion, and comparing of said second portion with said set of reference portions;
   (v) repeating said extracting step (iv) and said comparing step (iii) with successive portions until said successive portions have been identified as one of said known characters, and
   (vi) skipping a number of portions depending on said average width of said identified known character;
   (vii) starting from the last skipped portion, extracting a portion of said word and then repeating the process from step (ii) for the identification of next and subsequent characters.

2. A method as claimed in claim 1, characterized by the steps of:
   (a) forming (50) an initial vector (57) representing features of a single-dimensional cross-section of said script at a first position in the characters constituting the script, said initial vector chosen with reference to a word boundary;
   (b) comparing (60) said initial vector with a known vector from a set of reference vectors;
   ($b_i$) determining an accumulated uncertainty value relating to the degree with which the compared vector identifies a known character, and
   ($b_{ii}$) comparing said accumulated uncertainty value with a predetermined threshold value;
   (c) if said accumulated uncertainty value is less than said threshold value then recognizing said vector as said known character, otherwise selecting subsequent vectors for comparison with said set of reference vectors, and repeating steps ($b_i$) to ($b_{ii}$) until said uncertainty value is less than said threshold value, and then recognizing said initial and said subsequent vectors as said known character;
   (d) selecting a new initial vector in accordance with the character so identified, comparing said vector with said set of reference vectors, and repeating the process from step ($b_i$) for the identification of the next and subsequent characters.

3. A method as claimed in claim 2, in which steps (iii) through (vi) are repeated until another word boundary is reached, at which time the method is repeated from step (i) for a different word boundary.

4. A method as claimed in any claim 2, in which said cursive script is typewritten cursive script using characters selected from a predetermined font.

5. A method as claimed in claim 4, in which said set of reference portions is formed during a learning phase by the steps of:
    entering (70) into a storage device (90) said set of reference portions representative of possible portions relating to characters in said font, and assigning each such portion a particular label, and
    scanning (50) each character belonging to said font in turn to produce a sequence of portions and hence a sequence of labels identified with said character, and storing said sequences in said storage device (90).

6. A system for recognizing characters in cursive script in which the script is scanned to detect word boundaries (40) and words are then segmented into characters, characterized by:
    a sectioning means (50) for forming a series of portions representing features of cursive script at different positions in characters constituting the script; and
    recognition and segmentation means (60) for comparing an initial portion, chosen with reference to a word boundary, with a known portion from a set of reference portions and to compare subsequent portions in said series similarly with known portions, until the cumulative results of the comparison identify a character with an uncertainty less than a predetermined threshold value, said character having an average width,
    skipping means for skipping a number of portions determined by said average width of said identified character and determining the positions of said cursive script at which said sectioning means (50) and said recognition and segmentation means (60) shall be applied.

7. A system as claimed in claim 6, wherein said recognition and segmentation means is adapted to repeat the comparison process until another word boundary is reached and then to select a new initial portion and to repeat the comparison process for said new and subsequent portions.

8. A system as claimed in claim 7, wherein said sectioning means forms a series of vectors representing features of the script at different positions in the characters constituting the script.

9. A system as claimed in claim 8, wherein said recognition and segmentation means (60) includes a comparator adapted to:
    compare an initial vector, chosen with reference to a word boundary, with a known vector from a set of reference vectors;
    determine an accumulated uncertainty value relating to the degree with which the compared vector identifies a known character;
    compare said accumulated uncertainty value with a predetermined threshold value;
    if said accumulated uncertainty value is less than said threshold value then to recognize the character as said known character, otherwise to select subsequent vectors for comparison with said set of reference vectors, and to repeat the comparison process until said uncertainty value is less than said threshold value, and
    select a new initial vector in accordance with the character so identified, to compare said vector with said set of reference vectors, and to repeat the comparison process for the identification of the next and subsequent characters.

10. A system as claimed in claim 9, adapted to allow said set of reference portions to be formed during a learning phase by the steps of:
    entering (70) into a storage (90) device said set of reference portions representative of possible portions relating to characters in said font, and assigning each such portion a particular label, and
    scanning each character belonging to said font in turn to produce a sequence of portions and hence a sequence of labels identified with said character, and storing said sequences in said storage device.

11. Apparatus for recognizing characters in cursive script comprising:
    (a) means for image processing (40) to detect word boundaries and isolating patterns relating to words in the cursive script,
    (b) means for feature extraction (50) for receiving the output of means (40) for image processing and forming a series of vectors (57) representing features of the characters at different positions in the cursive script,
    (c) means for performing unsupervised learning (70) to generate a set of reference vectors representative of possible vectors relating to characters in the cursive script and storing them in a code book (90),
    (d) means for supervised learning (80) to compute statistics necessary for identification of characters in the cursive script, including (i) means for computing the a-priori conditional probability (100) of a vector relative to the nearest reference vector stored in the code book, and (ii) means for computing a-posteriori probability (110) of characters in the cursive script,
    (e) electron means for directing the output of said means for feature extraction (50) to the unsupervised learning means (70) or the supervised learning means (80),
    (f) means for performing recognition/segmentation (60) to compare known characters with referenced portions of characters in the cursive script until a character has been identified as one of the known characters, each of said known characters having an average width,
    (g) means for supplying input to said means for performing recognition/segmentation (60) from the code book (90); said means for computing a-posteriori probability (110) and said means for feature extraction (50),
    (h) output means connected to said means for performing recognition/segmentation (60) for providing recognized text or providing unrecognized text as an input to said means for feature extraction, and
    (i) skipping means for providing a number of portions to be skipped as an input to said means for feature extraction (50), said number based on input from said means for performing recognition/segmentation (110), said input based on said average width of said identified known character.

* * * * *